(12) United States Patent
Estes et al.

(10) Patent No.: US 7,763,845 B2
(45) Date of Patent: Jul. 27, 2010

(54) DOWNHOLE NAVIGATION AND DETECTION SYSTEM

(75) Inventors: Robert A. Estes, Tomball, TX (US); Rocco DiFoggio, Houston, TX (US); Eric B. Molz, Houston, TX (US); Constantyn Chalitsios, Houston, TX (US); Philip L. Kurkoski, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/503,688

(22) Filed: Aug. 14, 2006

(65) Prior Publication Data
US 2007/0034793 A1 Feb. 15, 2007

Related U.S. Application Data

(60) Provisional application No. 60/708,330, filed on Aug. 15, 2005.

(51) Int. Cl.
*G01V 5/08* (2006.01)
(52) U.S. Cl. .................................. 250/269.1
(58) Field of Classification Search ............. 250/269.1, 250/269.2, 269.3, 269.4, 269.5, 269.6, 269.7, 250/269.8
See application file for complete search history.

(56) References Cited

U.S. PATENT DOCUMENTS

| | | | | |
|---|---|---|---|---|
| 3,508,439 A * | 4/1970 | Alger | ...................... | 73/152.05 |
| 3,558,888 A * | 1/1971 | Youmans | .................. | 250/269.2 |
| 4,468,863 A * | 9/1984 | Van Steenwyk | ............. | 33/304 |
| 4,834,493 A * | 5/1989 | Cahill et al. | .................. | 385/77 |
| 5,001,342 A * | 3/1991 | Rambow | ..................... | 250/260 |
| 5,218,771 A * | 6/1993 | Redford | .................... | 33/366.12 |
| 5,659,133 A | 8/1997 | Sims et al. | ..................... | 73/116 |
| 6,347,282 B2 | 2/2002 | Estes et al. | ..................... | 702/6 |
| 6,584,837 B2 | 7/2003 | Kurkoski | ................. | 73/152.02 |
| 6,601,450 B2 * | 8/2003 | Burlingame | ............. | 73/504.08 |
| 6,755,246 B2 * | 6/2004 | Chen et al. | ............. | 166/250.01 |
| 6,766,855 B2 * | 7/2004 | Snoga | ..................... | 166/254.1 |

(Continued)

FOREIGN PATENT DOCUMENTS

SU    1045195 A  *  9/1983

OTHER PUBLICATIONS

Degani et al. "Optimal design and noise consideration of micromachined vibrating rate gyroscope with modulated integrative differential optical sensing", Sep. 1998, Journal of Michroelectromechanical Systems, vol. 7, No. 3, pp. 329-338.*

(Continued)

*Primary Examiner*—David P Porta
*Assistant Examiner*—Kiho Kim
(74) *Attorney, Agent, or Firm*—Mossman Kumar & Tyler PC

(57) ABSTRACT

A photodiode whose long-wavelength cutoff is in the short-wavelength range (preferably, between ultraviolet and yellowish-green) having reduced temperature sensitivity is used in downhole applications. It may be matched with scintillation devices having an output matched to the response curve of the photodiode for use with nuclear logging devices. The photodiode may also be used in gyroscopes in which light from an LED matched to the photodiode is reflected from a spinning mass.

23 Claims, 7 Drawing Sheets

U.S. PATENT DOCUMENTS

| | | | |
|---|---|---|---|
| 6,768,326 | B2 | 7/2004 | Brown et al. ............... 324/752 |
| 6,838,741 | B2 | 1/2005 | Sandvik et al. ............. 257/438 |
| 7,002,156 | B2 | 2/2006 | Sandvik et al. ........ 250/370.11 |
| 7,034,307 | B2 | 4/2006 | Sane et al. ............. 250/370.05 |
| 2002/0190207 | A1* | 12/2002 | Levy et al. .................. 250/306 |
| 2003/0052701 | A1 | 3/2003 | Brown et al. ............... 324/752 |
| 2003/0080294 | A1* | 5/2003 | Matocha et al. ........ 250/339.15 |
| 2003/0081218 | A1* | 5/2003 | Orban ........................ 356/450 |
| 2004/0079526 | A1 | 4/2004 | Cairns et al. ............. 166/255.2 |
| 2004/0108530 | A1 | 6/2004 | Sandvik et al. ............. 257/290 |
| 2004/0257911 | A1* | 12/2004 | Tang et al. .................... 367/81 |
| 2006/0146335 | A1* | 7/2006 | Mitchell et al. ............. 356/459 |

OTHER PUBLICATIONS

Rand Hulsing; *MEMS Inertial Rate and Acceleration Sensor*, 1996 IEEE, pp. 169-176.

*Harsh-Environment Solid-State Gamma Detector for Down-hole Gas and Oil Exploration*, DE-FC26-04NT42107, E&P Projects, http://ww.netl.doe.gov/scngo/NaturalGas/Projects_n/E&P/DCS/..... Oct. 11, 2005, pp. 1of 2.

J.E. Meisner et al.; *CsI(Tl) with Photodiodes for Identifying Subsurface Radionuclide Contamination*, 1994 IEEE Nuclear Science Symposium and Medical Imaging Conference, pp. 431-434, 6 Figs.

*Measurement of Radiation, Sodium Iodide Detector*, p. 11, http://www.physics.isu.ed/radinf/naidetector.htm Aug. 9, 2005, 1 page.

Special UV-Index Sensor, EryF, *sglux*, Features of the EryF special UV-Index Sensor date (unknown).

Condor Pacific Ind. Inc.; Minitact™ Two Axis Rate Gyro, date (unknown), pp. 1-2.

Herbert T. Califano; *Minitact Gyroscope—The Low Cost Alternative*, pp. 1-7, 11 Figs.

Peter P. Chow et al.; *AlGaN Schottky Diodes for short wavelength uv applications*, Paper 3948-32 for presentation at SPIE Optoelectronics 2000, Jan. 2000, 8 Figs.pp. 1-20 (10 shts).

Boston Electronics Corporation, Q:\Product Literature\UV\UV brochure back cover spectral response.doc, Jun. 26, 2002.

Hamamatsu, Flame Sensor UV Tron® R2868, Quick Detection of Flame for Distance, Compact UV Sensor with High Sensitivity and Wide Directivity, Suitable for Flame Detectors and Fire Alarms, pp. 1-2.

Hamamatsu, UV Tron® Driving Circuit, C3704 Series, Compact, Lightweight, Low Current Consumption, Low Cost Operates as High Sensitivity UV Sensor with UV Tron Suitable for Flame Detectors and Fire Alarms, pp. 1-2.

Boston Electronics Corporation, Flame Sensors, date (unknown), pp. 1-3.

Hans Rabus, ultra-performance in the Ultraviolet, spie's oemagazine, Sep. 2003, pp. 21-24.

Gradium® Lenses, LightPath Technologies, *focusing on optical solutions*, pp. 22-27.

Boston Electronics Corporation, Ultraviolet Photodetectors, date (unknown), pp. 1-20.

SVT Associates, SVTA UV-A, UV-B, and UV-C Photodetector.

Boston Electronics Corporation, Aging properties of Silocon Carbide and Various other solid state UV photodetectors under 254 nm Hg lamp irradiation, pp. 1-5.

* cited by examiner

DOWNHOLE NAVIGATION AND DETECTION SYSTEM

CROSS-REFERENCES TO RELATED APPLICATIONS

This application claims priority from U.S. Provisional Patent Application Ser. No. 60/708,330 filed on 15 Aug. 2005.

BACKGROUND OF THE INVENTION

This invention relates generally to oil and gas well logging tools. More particularly, this invention relates tools for measuring rock formation properties such as density and porosity. This invention relates to an improved density tool using radiation detectors with improved operating characteristics at high temperatures that may be used in cased holes as well as open holes.

In petroleum and hydrocarbon production, it is desirable to know the porosity and density of the subterranean formation which contains the hydrocarbon reserves. Knowledge of porosity is essential in calculating the oil saturation and thus the volume of oil in-place within the reservoir. Knowledge of porosity is particularly useful in older oil wells where porosity information is either insufficient or nonexistent to determine the remaining in-place oil and to determine whether sufficient oil exists to justify applying enhanced recovery methods. Porosity information is also helpful in identifying up-hole gas zones and differentiating between low porosity liquid and gas.

If the density of the formation is known, then porosity can be determined using known equations. A variety of tools exist which allow the density of the reservoir to be determined. Most of these tools are effective in determining the density (and hence porosity) of the reservoir when the wellbore in which the tool is run is an uncased reservoir and the tool is able to contact the subterranean medium itself. However, once a well has been cased, there exists a layer of steel and concrete between the interior of the wellbore where the tool is located and the formation itself. The well casing makes it difficult for signals to pass between the tool and the reservoir and vice-versa.

Many of the commonly used porosity and density measuring tools rely on the detection of gamma rays or neutrons resulting from activation of either a neutron source downhole or a gamma ray source. Fundamental to the detection of radiation is the use of scintillation counters for radiation detection. Scintillation is produced by ionizing radiation. The light flashes are typically converted into electric pulses by a photoelectric alloy of cesium and antimony, amplified about a million times by a photomultiplier tube, and finally counted. Scintillation counters permit high-speed counting of particles and measurement of the energy of incident radiation.

This arrangement has several disadvantages. Firstly, photomultiplier tubes require high voltages. The high voltage means that bulky insulation has to be provided. Photomultiplier tubes are inherently bulky, a disadvantage for downhole applications where space is at a premium. Their output can become noisy at the elevated temperatures encountered in boreholes. In order to reduce the effects of elevated temperatures, Dewar flasks may be used to keep the temperature down—another operational disadvantage. The noise becomes worse as the photomultiplier tube ages and has been exposed to long periods of vibration. Photomultiplier tubes can be damaged by vibration and the harsh conditions encountered downhole.

It would be desirable to have downhole radiation detectors that do not suffer from the drawbacks associated with photomultiplier tubes. The present invention satisfies this need.

SUMMARY OF THE INVENTION

One embodiment of the invention is an apparatus for evaluating an earth formation. The apparatus comprises a logging tool conveyed in a borehole in the earth formation and on orientation sensor which provides an indication of an orientation of the logging tool, the orientation sensor including at least one photodiode having a bandgap greater than about 2 eV. The orientation sensor may be a two-axis, spinning mass gyroscope. The orientation sensor may further include a light-emitting diode having an output which matches a response of the at least one photodiode. The logging tool may further include at least one formation evaluation (FE) sensor responsive to a property of the earth formation. The at least one FE sensor may include a radiation source which irradiates the earth formation and a plurality of detectors which are responsive to interaction of the irradiation with the earth formation. The radiation source may be a neutron source and the detectors may include scintillation counters responsive to gamma rays. The radiation source may be a neutron source and the detectors may include scintillation counters responsive to neutrons. The at least one FE sensor may include a photodiode having a bandgap greater than about 2 eV, may include an array of photodiodes and/or a gradient refractive index lens. The apparatus may include a processor which uses an output of the at least one FE sensor and an output of the orientation sensor to provide an image of the earth formation. The logging tool may be conveyed in a cased borehole. The logging tool may be conveyed in the borehole on a drilling tubular and the apparatus may include a processor which uses an output of the orientation sensor to control a direction of drilling.

Another embodiment of the invention is a method of evaluating an earth formation. A logging tool is conveyed into a borehole in the earth formation. An indication of an orientation of the logging tool is obtained using an orientation sensor that includes a photodiode having a bandgap greater than about 2 eV. A two-axis, spinning mass gyroscope may be used as the orientation sensor. A light-emitting diode whose output matches a response of the at least one photodiode may be used in the orientation sensor. At least one formation evaluation sensor may be used as part of the method. Irradiation of the formation may be done using a radiation source on the logging tool, a plurality of detectors being used to provide an output responsive to interaction of the irradiation with the earth formation. A neutron source may be used along with a scintillation detector responsive to gamma rays or with a scintillation detector responsive to neutrons. The formation evaluation sensor may include a photodiode having a gap band greater than about 2 eV, an array of photodiodes and/or a gradient refractive index lines. The output of the formation evaluation sensor and the orientation sensor may be used to provide an image of the earth formation. The logging tool may be conveyed in a cased borehole. The logging tool may be conveyed on a drilling tubular and output of the orientation sensor may be used to control a direction of drilling.

Another embodiment of the invention is a computer-readable medium for use with an apparatus for evaluation an earth formation. The apparatus includes a logging tool including a formation evaluation sensor conveyed in a borehole and an orientation sensor which provides an indication of an orientation of the logging tool, the orientation sensor including at least one photodiode having a bandgap greater than about 2 eV. The medium includes instructions which enable a processor to use an output of the FE sensor and the orientation sensor to provide an image of the earth formation. The medium may include a ROM, an EPROM, an EEPROM, a flash memory, and/or an optical disk.

BRIEF DESCRIPTION OF THE FIGURES

The present invention is best understood with reference to the accompanying figures in which like numerals refer to like elements and in which.

DETAILED DESCRIPTION OF THE INVENTION

Figure 1:
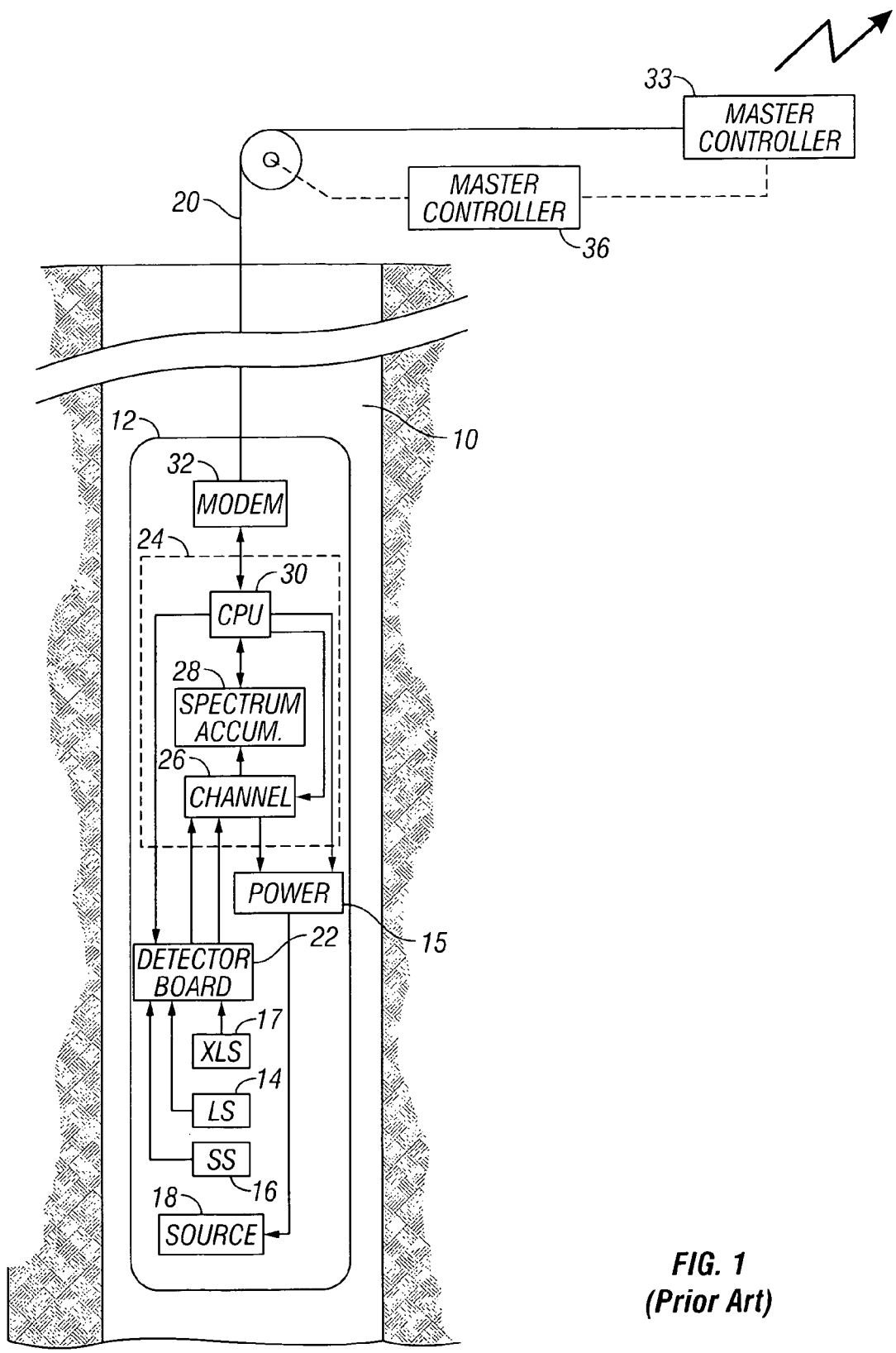
FIG. 1 (prior art) is an overall schematic diagram of an exemplary nuclear well logging system.

The system shown in FIG. 1 is an exemplary prior art system for density logging. Well 10 penetrates the earth's surface and may or may not be cased depending upon the particular well being investigated. It is a wireline system. This is not a limitation of the invention as the method of the invention is applicable to MWD systems and an MWD implementation of the apparatus may be done. Disposed within well 10 is subsurface well logging instrument 12. The system diagramed in FIG. 1 is a microprocessor-based nuclear well logging system using multi-channel scale analysis for determining the timing distributions of the detected gamma rays. Well logging instrument 12 includes an extra-long spaced (XLS) detector 17, a long-spaced (LS) detector 14, a short-spaced (SS) detector 16 and pulsed neutron source 18. In one embodiment of the invention, XLS, LS and SS detectors 17, 14 and 16 are comprised of bismuth-germanate (BGO) crystals coupled to photomultiplier tubes. To protect the detector systems from the high temperatures encountered in boreholes, prior art detector systems may be mounted in a Dewar-type flask. The present invention envisages eliminating the Dewar flask for reasons discussed below. Also, in one embodiment of the invention, source 18 comprises a pulsed neutron source using a D-T reaction wherein deuterium ions are accelerated into a tritium target, thereby generating neutrons having an energy of approximately 14 MeV. This particular type of source is for exemplary purposes only and not to be construed as a limitation. The filament current and accelerator voltage are supplied to source 18 through power supply 15. Cable 20 suspends instrument 12 in well 10 and contains the required conductors for electrically connecting instrument 12 with the surface apparatus.

The outputs from XLS, LS and SS detectors 17, 14 and 16 are coupled to detector board 22, which amplifies these outputs and compares them to an adjustable discriminator level for passage to channel generator 26. Channel generator 26 is a component of multi-channel scale (MCS) section 24 which further includes spectrum accumulator 28 and central processor unit (CPU) 30. MCS section 24 accumulates spectral data in spectrum accumulator 28 by using a channel number generated by channel generator 26 and associated with a pulse as an address for a memory location. After all of the channels have had their data accumulated, CPU 30 reads the spectrum, or collection of data from all of the channels, and sends the data to modem 32 which is coupled to cable 20 for transmission of the data over a communication link to the surface apparatus. Channel generator 26 also generates synchronization signals which control the pulse frequency of source 18, and further functions of CPU 30 in communicating control commands which define certain operational parameters of instrument 12 including the discriminator levels of detector board 22, and the filament current and accelerator voltage supplied to source 18 by power supply 15.

The surface apparatus includes master controller 34 coupled to cable 20 for recovery of data from instrument 12 and for transmitting command signals to instrument 12. There is also associated with the surface apparatus depth controller 36 which provides signals to master controller 34 indicating the movement of instrument 12 within well 10. The system operator accesses the master controller 34 to allow the system operator to provide selected input for the logging operation to be performed by the system. Display unit 40 and mass storage unit 44 are also coupled to master controller 34. The primary purpose of display unit 40 is to provide visual indications of the generated logging data as well as systems operations data. Storage unit 44 is provided for storing logging data generated by the system as well as for retrieval of stored data and system operation programs. A satellite link may be provided to send data and or receive instructions from a remote location.

In a well logging operation such as is illustrated by FIG. 1, master controller 34 initially transmits system operation programs and command signals to be implemented by CPU 30, such programs and signals being related to the particular well logging operation. Instrument 12 is then caused to traverse well 10 in a conventional manner, with source 18 being pulsed in response to synchronization signals from channel generator 26. Typically, source 18 is pulsed at a rate of 1000 bursts/second (1 KHz). This, in turn, causes a burst of high energy neutrons on the order of 14 MeV to be introduced into the surrounding formation to be investigated. As discussed below with reference to FIG. 2, this population of high energy neutrons introduced into the formation will cause the generation of gamma rays within the formation which at various times will impinge on XLS, LS and SS detectors 17, 14 and 16. As each gamma ray thus impinges upon the crystal-photomultiplier tube arrangement of the detectors, a voltage pulse having an amplitude related to the energy of the particular gamma ray is delivered to detector board 22. It will be recalled that detector board 22 amplifies each pulse and compares them to an adjustable discriminator level, typically set at a value corresponding to approximately 100 KeV. If such pulse has an amplitude corresponding to an energy of at least approximately 100 KeV, the voltage pulse is transformed into a digital signal and passed to channel generator 26 of MCS section 24.

In addition, as would be known to those versed in the art, many of the functions of the components described with reference to FIG. 1 may be carried out by a processor. It should also be noted that the system described in FIG. 1 involves conveyance of the logging device into the well by a wireline. However, it is envisaged that the logging device could be part of a measurement while drilling (MWD) bottom hole assembly conveyed into the borehole by a drilling tubular such as a drillstring or coiled tubing. In addition, it should be noted that FIG. 1 illustrates a tool in an open hole. The method and apparatus are equally well suited for use in cased holes.

Figure 2:
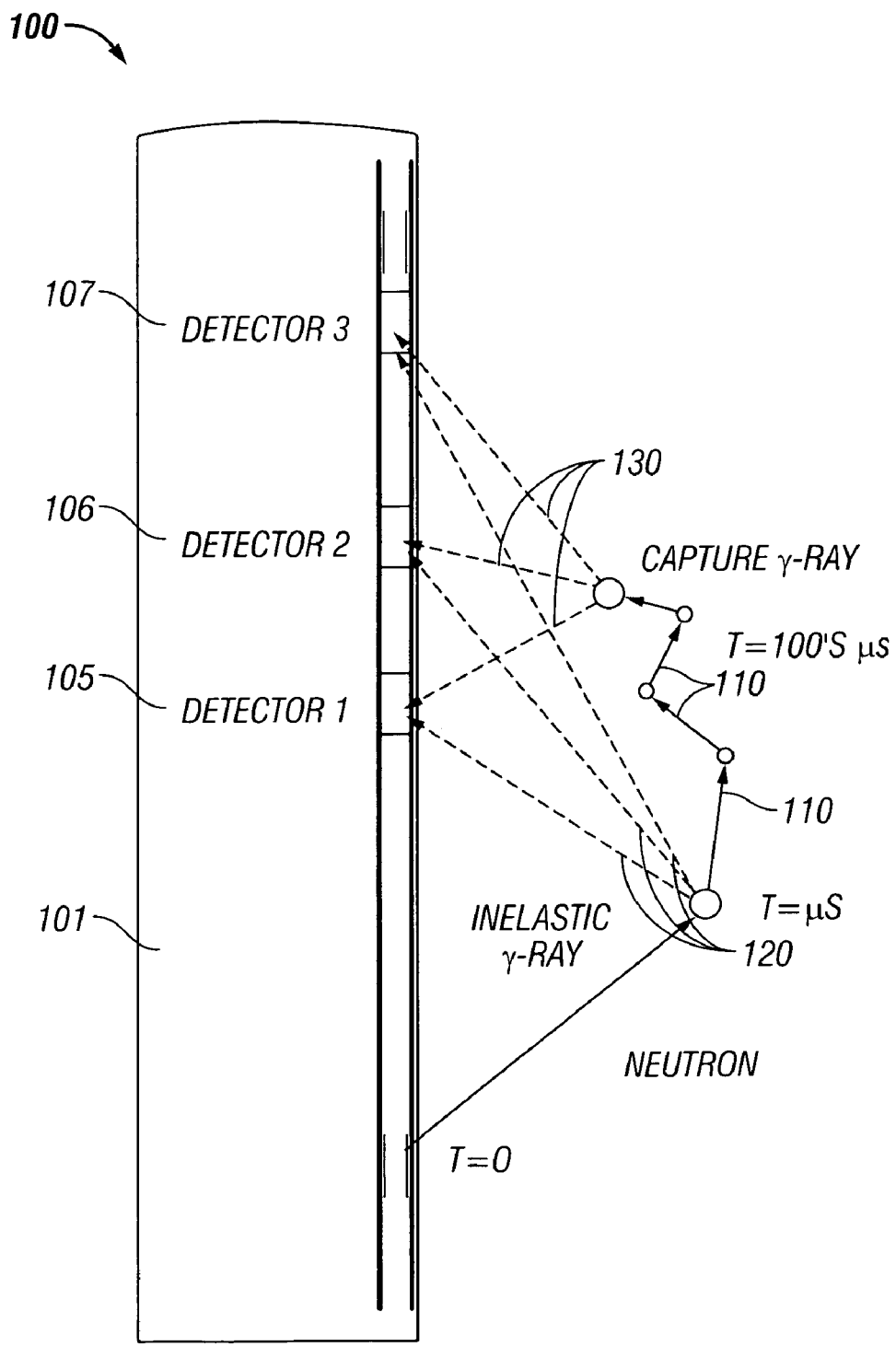
FIG. 2 (prior art) illustrates the generation of gamma rays by inelastic scattering and capture of thermal and epithermal neutrons.

FIG. 2 shows an illustration of the logging tool suitable for use with the present invention. The apparatus illustrated is that of the Reservoir Performance Monitor (RPM) of Baker Atlas, Incorporated. A measurement device 100 comprises a neutron source 101 and three axially spaced apart detectors described below. The number of detectors shown in the embodiment of FIG. 2 is only an example of the number of detectors employed in an embodiment of the present invention. It is not a limitation on the scope of the present invention. The measurement device of the present invention may comprise two or more detectors. The neutron source 101 may be pulsed at different frequencies and modes for different types of measurements. Detector short-spaced (SS) detector 105 is closest to the source 101. The long-spaced (LS) detector is denoted by 106, and the furthest detector 107 is referred to as the extra-large spaced (XLS) detector. Fast neutrons (approximately 14 MeV) are emitted from the source 101 and enter the borehole and formation, where they undergo several types of interactions. During the first few microseconds (µs), before they lose much energy, some neutrons are involved in inelastic scattering with nuclei in the borehole formation and produce gamma rays. These inelastic gamma rays 120, have energies that are characteristic of the atomic nuclei that produced them. The atomic nuclei found in this environment include, for example, carbon, oxygen, silicon, calcium, and some others.

Two or more gamma-ray detectors are employed, in one or more modes of operation. Such modes include, but are not limited to, a pulsed neutron capture mode, a pulsed neutron spectrometry mode, a pulsed neutron holdup imager mode, and a neutron activation mode. In a pulsed neutron capture mode, for example, the tool pulses at 1 kHz, and records a complete time spectrum for each detector. An energy spectrum is also recorded for maintaining energy discrimination levels. Time spectra from short-spaced and long-spaced detectors can be processed individually to provide traditional thermal neutron capture cross section information, or the two spectra can be used together to automatically correct for borehole and diffusion effects and produce results substantially approximating intrinsic formation values.

Figure 3:
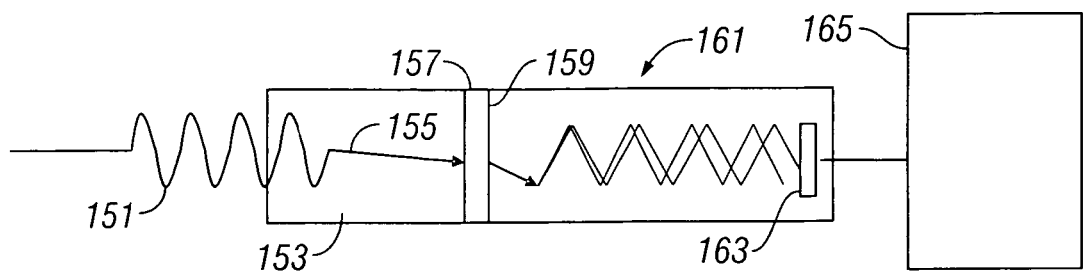
FIG. 3 (prior art) shows the arrangement of a scintillation device and a photomultiplier tube for nuclear radiation measurements.

The basic configuration of a prior art device for measurement of radiation using a scintillation detector is show in FIG. 3. Incoming radiation 151 impinges on the scintillation material 153 which produces light 155. The light passes through an optical window 157 to the cathode 159 of a photomultiplier tube 161. The output of anode 161 of the photomultiplier tube goes to a processor 163 which analyzes the signals.

The present invention uses a solid-state device known as a photodiode instead of a photomultiplier tube for measuring the scintillation. A device of this type comprises a thin semiconductor wafer that converts the incident light photons into electron-hole pairs. As many as 80 or 90 percent of the light photons will undergo this process, and so the equivalent quantum efficiency is considerably higher than in a photomultiplier tube. There is no amplification of this charge, however, so the output pulse is likely to be smaller than for a photomultiplier tube. However, the photodiode is a much more compact and rugged device, operates at low voltage, and offers corresponding advantages in certain applications, Photodiodes do not detect photons whose energies are less than the photodiode's bandgap energy. A photon's energy in electron volts is $E=hc/\lambda$, where $hc=1239.84$ eV nm and $\lambda$ is in nm. Therefore, the greater the photodiode's bandgap, the shorter the wavelength of light (towards the blue and ultraviolet) that the photodiode begins detecting. By "blue photodiode", we mean a photodiode that does not see wavelengths longer than blue light, which has a wavelength of approximately 450 nm corresponding to 2.76 eV. Ordinary silicon photodiodes see wavelengths of light that are far longer than blue and which extend into the near infrared around 1100 nm that corresponds to 1.13 eV. Thermally generated electrons and holes reduce photodiode response and increase noise. However, the greater the bandgap, the fewer the number of thermally generated electrons and holes that are created. Although photodiode designers can reduce the temperature dependence of any wavelength photodiode by adjusting its bulk resistivity or the thickness of the bulk substrate or by other techniques, the dominant factor in the temperature sensitivity of a photodiode is still the photodiode's bandgap. FIG. 1 of U.S. Pat. No. 5,659,133 to Sims et al. shows that, at 160° C., the shunt resistance of a GaP photodiode (bandgap of 2.26 eV corresponding to yellowish-green cutoff) is about 40 million times better (higher) than the shunt resistance of a typical silicon photodiode (bandgap of 1.13 eV). Therefore, unlike the silicon photodiode, the GaP photodiode response will change very little at 160° C. because shunt resistance is inversely related to the number of thermally-excited electrons and holes. In this example, we see that doubling the bandgap energy improved thermal behavior by a factor of 40 million. For reference, Table 1 relates wavelength to photon energy and the common name for the corresponding color of light.

TABLE 1

| Wavelength vs Photon Energy and Color Name | | |
|---|---|---|
| Wavelength | eV | Description |
| 350 nm | 3.54 | UV |
| 380 nm | 3.26 | Near UV |
| 400 nm | 3.10 | Border UV |
| 420 nm | 2.95 | Violet |
| 442 nm | 2.81 | Violet-blue |
| 450 nm | 2.76 | Blue |
| 488 nm | 2.54 | Greenish-blue |
| 500 nm | 2.48 | Bluish-green |
| 514 nm | 2.41 | Green |
| 550 nm | 2.25 | Yellowish-green |
| 580 nm | 2.14 | Yellow |
| 594 nm | 2.09 | Orangey-yellow |
| 600 nm | 2.07 | Orange |
| 612 nm | 2.03 | Reddish-orange |
| 633 nm | 1.96 | Orangey-red |
| 647 nm | 1.92 | Red |
| 685 nm | 1.81 | Deep red |
| 700 nm | 1.77 | Border IR |
| 750 nm | 1.65 | Near IR |
| 1100 nm | 1.13 | Silicon photodiode bandgap |

Figure 4:
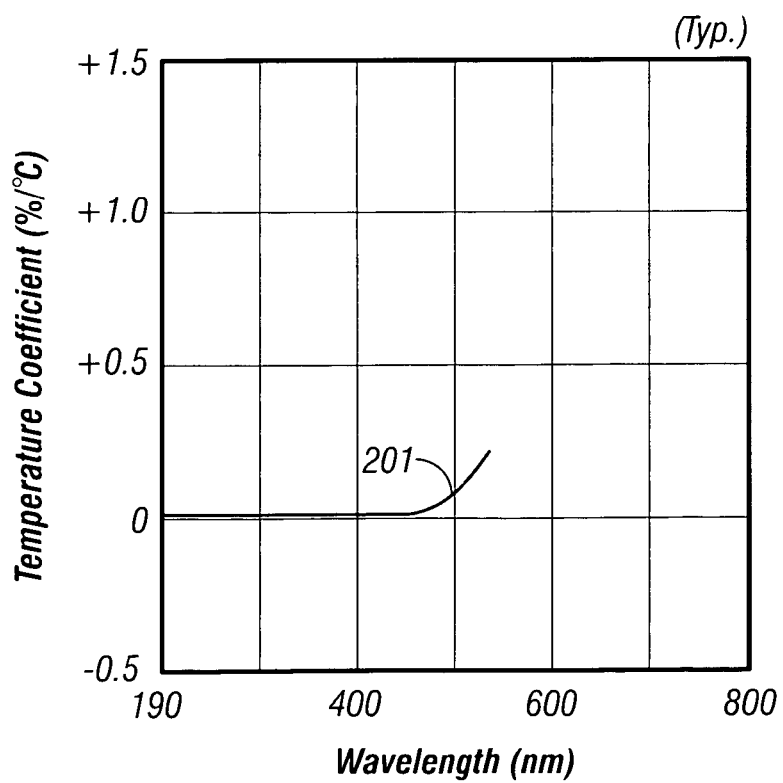
FIG. 4 shows the temperature sensitivity of an exemplary photodiode suitable for use with an embodiment of the invention.

Referring now to FIG. 4, one advantage of using a photodiode will be apparent. Shown is a curve 201 showing the temperature coefficient (percent per degree Celsius) as a function of wavelength for an exemplary photodiode (the G1961 Gallium Phosphide diode) distributed in the US by Hamamatsu Corporation. The figure shows over a wavelength range of 100 nm to 400 nm, the temperature coefficient is miniscule, so that even at an operating temperature of 200° C., the effect of temperature would be small, and even at a wavelength of 500 nm, the change in the response would be less than 40%.

Figure 5:
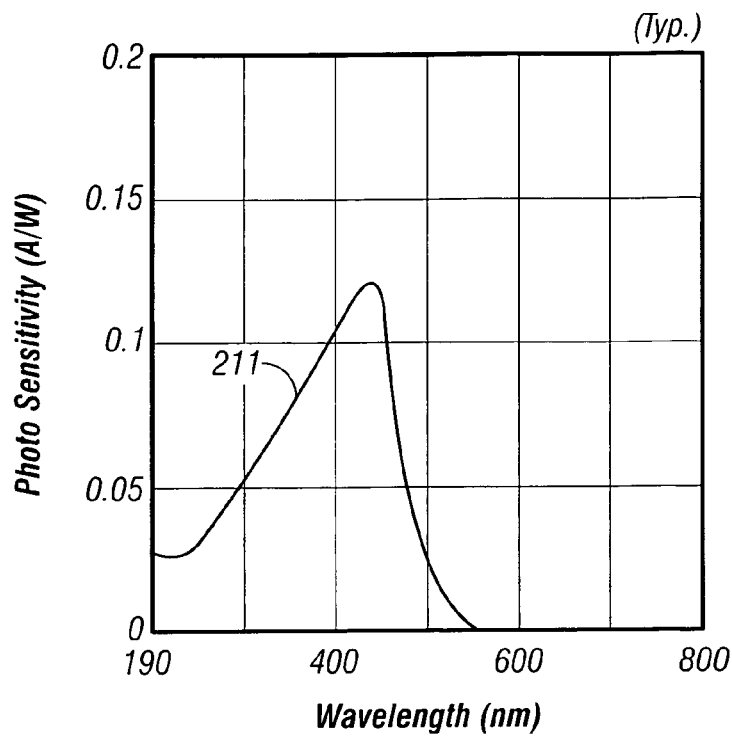
FIG. 5 shows the spectral response corresponding to the temperature sensitivity curve of FIG. 4.

FIG. 5 shows photosensitivity 211 of the G1961 GaP diode. As can be seen, the operating range is from 200 nm-600 nm with a peak sensitivity at 440 nm. 440 nm is in the violet-blue range of the visible spectrum. Other photodiodes such as a Gallium-Nitride photodiode have a peak sensitivity at about 350 nm. Silicon Carbide (SiC) photodiodes may be used over a range of 210-380 nm. With the exception of GaP (550 nm), these wavelengths are in the ultraviolet range (100 nm-400 nm). It is desirable to select scintillation materials to have an output that matches the response characteristics of the photodiodes. Sodium Iodide, for example, has an output below 415 nm while Bismuth Germanate has an output between 320-480 nm. For the purposes of the present invention, the important factor is the selection of a photodiode material that has the desired stability at elevated temperatures. It so happens that most of the common photodiodes that meet this requirement have long-wavelength cutoffs between ultraviolet and yellowish-green. The choice of the scintillation materials is then based on the photodiode characteristics to provide a proper match.

Figure 6:
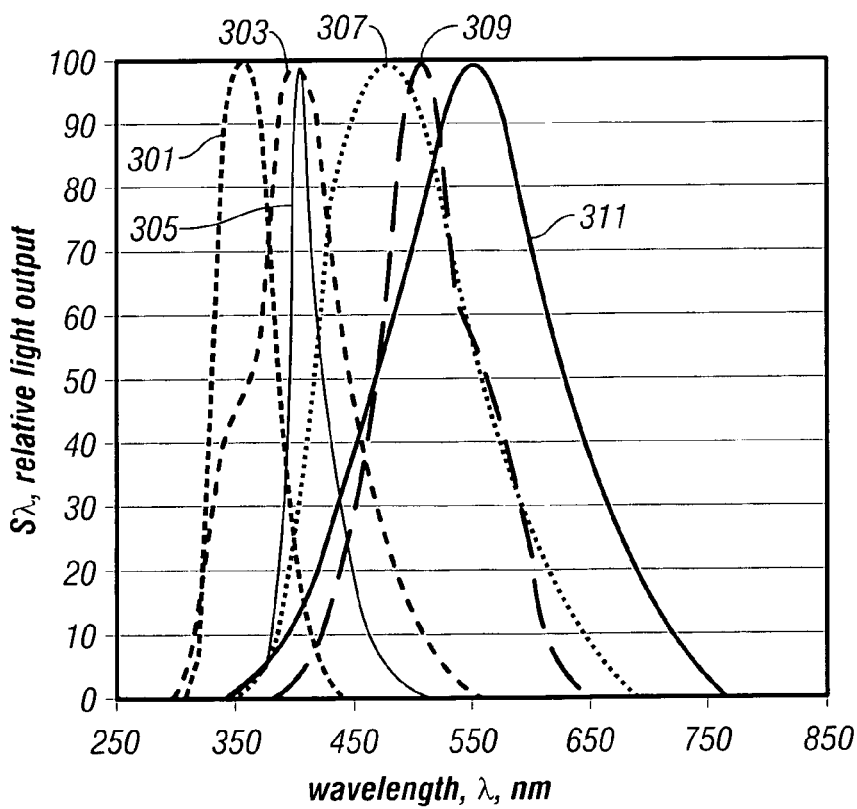
FIG. 6 (prior art) shows the spectral output of a number of scintillation crystals.

FIG. 6 shows the output characteristics of common scintillation materials. 301 is the curve for YAP(Ce) (Yttrium Alumimum Perovskiite activated by Cesium), a fast, mechanically strong and chemically resistant scintillation material. 305 is the curve for NaI. The curves 307 and 309 are for BC404 and BGO respectively while the curves 311 and 313 are for CdWO4 and CsI. The last two are clearly out of the range at which desirable photodiodes operate.

A practical constraint on the signal levels of the system using photodiodes is the area of the photodiodes. Photomultiplier tubes have a larger surface area than most photodiodes, so that a single photomultiplier tube can collect most of the output of a large scintillator merely by being placed against it. When using a photodiode, one with a large area should be selected. An example of a photodiode with a large surface area (16 mm$^2$) is the TW30SY of Sglux Gmbh which has a spectral response over the range 215-387 nm. In addition to or an alternative to a photodiode with a large area, one embodiment of the invention uses a lens to capture the output of the scintillation crystal and focus it onto a photodiode. A GRIN (gradient refractive index) lens whose material refractive index varies continuously as a function of spatial coordinates in the medium may be used. A GRIN with flat surfaces can focus light just as a normal lens with curved surfaces does and is easier to fit into the space requirements of a downhole tool. An optical bonding agent may be interposed between the lens and the scintillating crystal and between the crystal and the photodiode.

Figure 7:
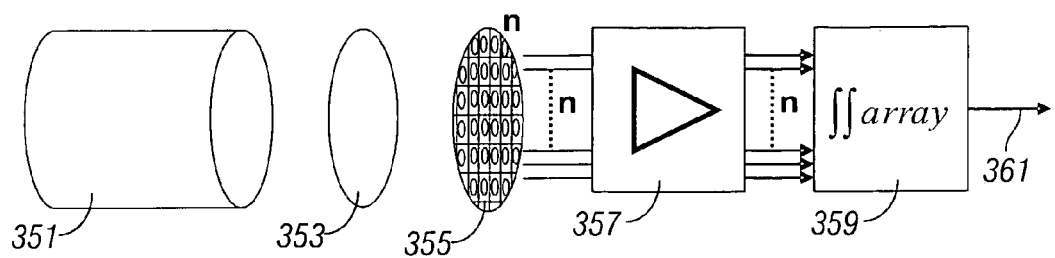
FIG. 7 shows an embodiment of the present invention using a scintillation crystal in combination with an array of photodiodes for making nuclear radiation measurements.

Instead of using a lens, an array of photodiodes may be used to increase the signal level. This is illustrated in FIG. 7. The scintillation crystal 351 is coupled through the optical coupler 353 to an array of photodiodes 355. The output of the elements of photodiode array are amplified by the preamplifier 357 and then integrated by the array integrator 359 to give the electrical output 361 indicative of the radiation impinging on the scintillation crystal. The array integrator may include the necessary weighting to correct for differences in sensitivity of the individual photodiodes and their corresponding amplifier gains.

Figure 8:
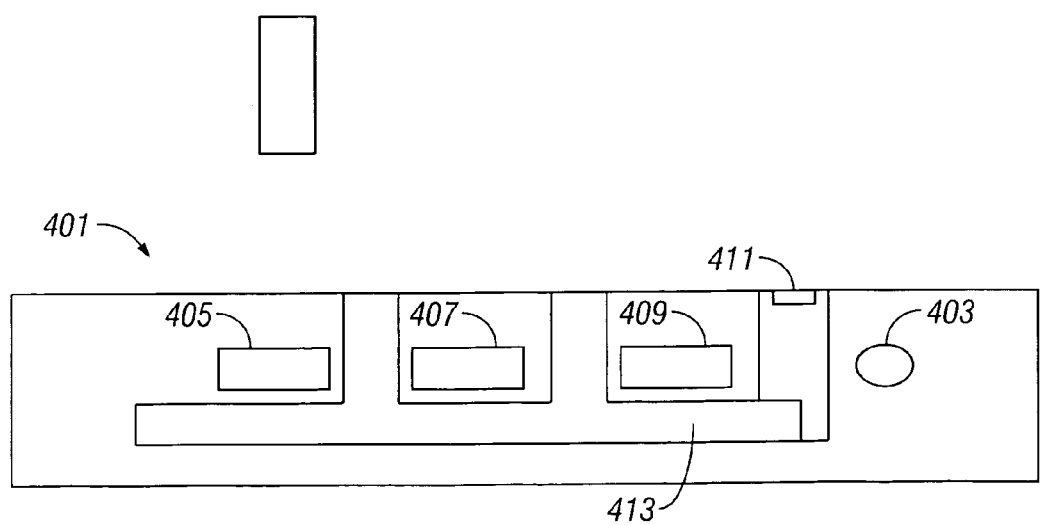
FIG. 8 shows an embodiment of the present invention using scintillation/photodiode devices along with a standoff sensor.

Portions of one embodiment of a downhole density logging tool according to the present invention are shown in FIG. 8. The density tool 401 includes three scintillator/photodiode (S-PD) combinations denoted by 405, 407, 409 for the extralong spaced, long-spaced and short spaced detectors. As noted above, a lens may be included with the S-PD. A nuclear source is denoted by 403 and may be a gamma ray source or a neutron source. Shielding 413 is provided to shield the detectors from direct radiation from the source. A backscatter detector 411 may also be part of the tool. It should be noted that the use of three main detectors and a back-scatter detector is for illustrative purposes, and more or fewer detectors may be used. Not shown in FIG. 8 is the processing (which may be done by a downhole processor).

One advantage of using the S-PD combination is the reduced space compared to scintillators in combination with photomultiplier tubes. In one embodiment of the invention, a standoff transducer is interposed between a pair of the S-PDs. This can greatly improve the processing of nuclear measurements and allow correlation of the imaged nuclear measurement with ultrasonic images and resistivity images. For example, standoff measurements are used in U.S. Pat. No. 6,584,837 to Kurkoski to produce an azimuthal density image of the earth formation.

Figure 9:
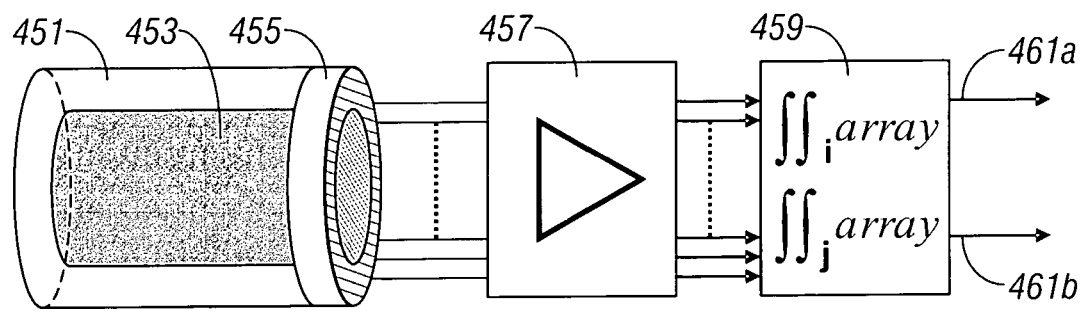
FIG. 9 shows an embodiment of the present invention in which two different types of nuclear radiation measurements may be made simultaneously.

Another embodiment of the invention is capable of making simultaneous measurements of gamma rays and neutron radiation. This is illustrated in FIG. 9 where two scintillation crystals are used. One of them, 451 for example, is responsive to neutron radiation and the other, 453 for example, is responsive to gamma rays. The outputs of the two scintillation crystals are optically coupled by an optical coupler to two arrays of photodiodes (or two photodiodes) 455. The output of the photodiodes is amplified by the preamplifier 457 and integrated by two array integrators 459 to give separate signals 461a, 461b indicative of the neutron radiation and the gamma rays. The array integrators are optional and used only when the output of each scintillation crystal is gathered by an array of photodiodes. It should be noted that the photodiode(s) used with the gamma ray measurements may be different from the photodiode(s) used for neutron measurements to account for the possibility that the output of the two scintillation crystals may be in different spectral bands.

Figure 10A:
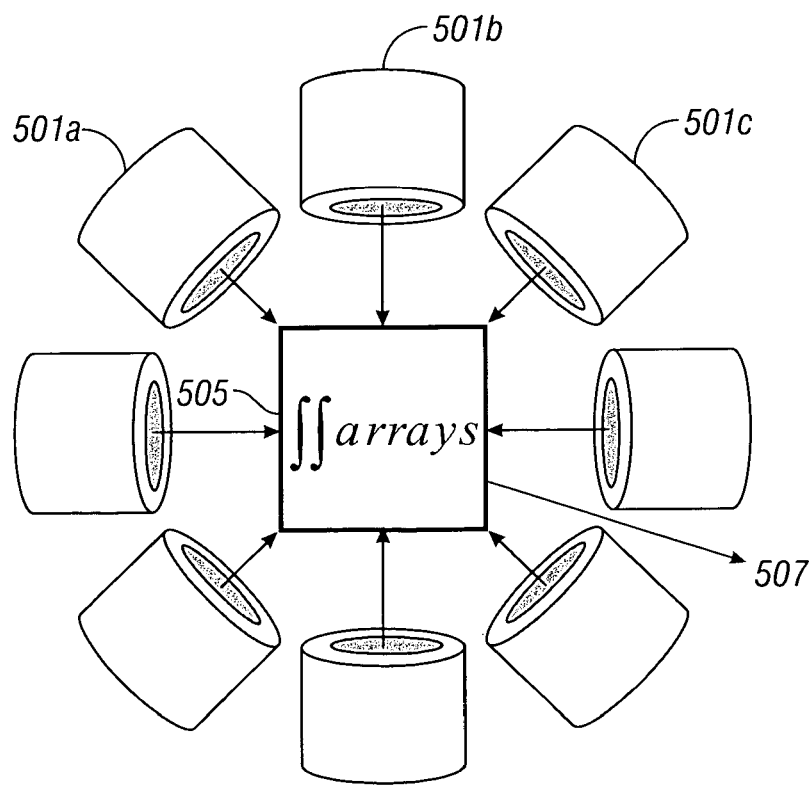
FIGS. 10a, 10b show an embodiment of the present invention for making azimuthal measurements of nuclear radiation in a borehole.
Figure 10B:
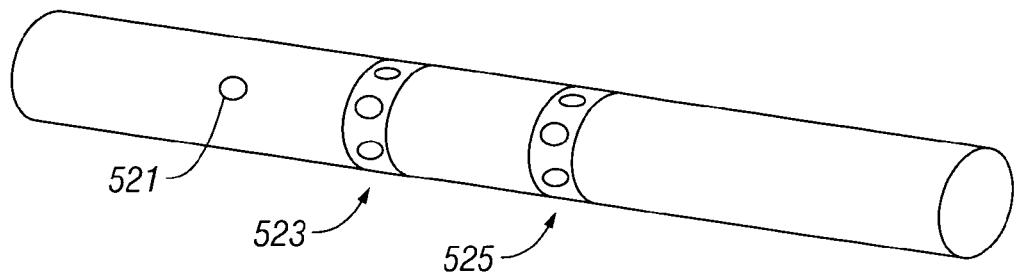

Another embodiment of the invention is illustrated in FIGS. 10a, 10b. Shown in FIG. 10a are a plurality of S-PDs 501a, 501b . . . 501c. Six such detectors are shown, though this is not to be construed as a limitation of the invention. The S-PDS are azimuthally distributed around the center of the tool. Each of the S-PDs comprises a scintillation crystal and one or more photodiodes. The outputs of the S-PDs are integrated by the array integrators 505 and outputs 507 are produced corresponding to each of the azimuthal directions defined by the S-PDs 501a, 501b . . . 501c. This makes it possible to obtain an azimuthal density or porosity image of the borehole.

FIG. 10b shows the arrangement of two of the S-PDs of FIG. 10a spaced apart on a tool. Shown is the source 521 and two arrays of azimuthally sensitive S-PDs denoted by 523 and 525. The sources and the detectors could be configured for making neutron and/or gamma ray measurements as discussed above with reference to FIG. 9

The use of photodiodes in evaluation of the near surface of the earth has been discussed before by Meisner et al. They have used a combination of a CsI scintillation detector in combination with two side-mounted photodiodes. The assembly is mounted on steel pipes and pushed into the earth The use of CsI scintillation detector clearly puts the response into the optical range (see 309 in FIG. 6). In addition, Meisner teaches away from the use of photodiodes for high temperature applications and recommends the use of photomultiplier tubes where high temperatures are encountered. The use or scintillation detectors in combination with photodiodes in the present invention is thus believed to be novel and not suggested in prior art.

The present invention includes other applications of photodiodes for downhole applications. An important aspect of drilling of wells is that of navigation. In the context of drilling, the term navigation refers to measurements that are made to establish the location and orientation of the well. U.S. Pat. No. 6,347,282 to Estes et al, having the same assignee as the present invention and the contents of which are incorporated herein by reference, discloses a gyroscopic apparatus for use in MWD and methods for removing the bias in the gyroscope measurements. The type of gyroscope used in the Estes device is a spinning mass gyro.

Figure 11:
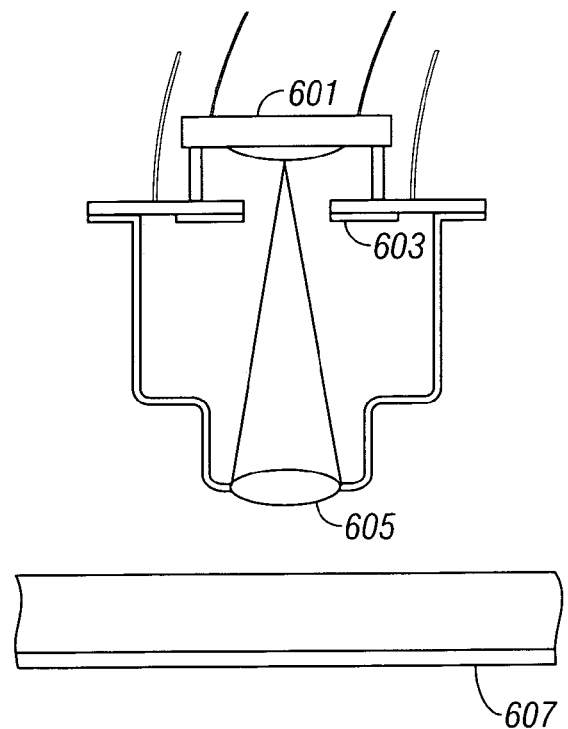
FIG. 11 is an illustration of a spinning mass gyro that has been modified in the present invention.

Due to the continuing rotation of the drillstring, a gyro for MWD measurements has to have a large dynamic range. An example of a device which has the large dynamic range needed for MWD applications is the Minitact™ gyroscope of BAE Systems. This is illustrated schematically in FIG. 11. Shown is a spinning rotor 607. Light from an LED 601 is reflected off the mirrored surface of a spinning rotor. In the present invention, the reflected light strikes a quadrature photodetector 603 which comprises four photodiode segments. The modification made to the standard Minitact™ is discussed below. Any inclination of the rotor axis results in a difference in the signal amplitude on opposite photodiodes. By driving a torquer coil to maintain a balance in the detected light amplitude between mating halves, the control circuitry can keep the gyroscope "zeroed" in the ambient rate environment of the housing.

As noted in the brochure for Minitact™, it is "a small, lightweight two-axis rate sensor with exceptional performance characteristics. It is currently qualified for Missile, Torpedo, Tank, and Aircraft applications." Also noted in the brochure is an operating temperature range of −51° C. to 71° C. The use of the modified Minitact™ for downhole high temperature applications is thus new. The prior art Minitact™ has been operated at temperatures up to 125° C. Near this limit, it is necessary to run very high current through the LED to compensate for the reduced illumination and lower detected amplitude which occurs at high downhole temperatures. The power dissipation in the LED is approximately 0.75 watts. This is a major portion of the entire power budget for an MWD gyro survey tool and is also a major source of heat. Given the temperature sensitivity of the gyro, the LED power consumption is a major cause of error.

Accordingly, in one embodiment of the invention, the existing Minitac™ is modified by incorporating a photodiode with reduced temperature sensitivity such as that described above with reference to nuclear sensors. Such a photodiode operates in the violet or ultraviolet range (less than about 440 nm). The Minitact™ is also modified to have an LED that is selected to have an output matched to the response curve of the photodiode. During operation of the gyro assembly, the settings are optimized for reduced power consumption.

Figure 12:
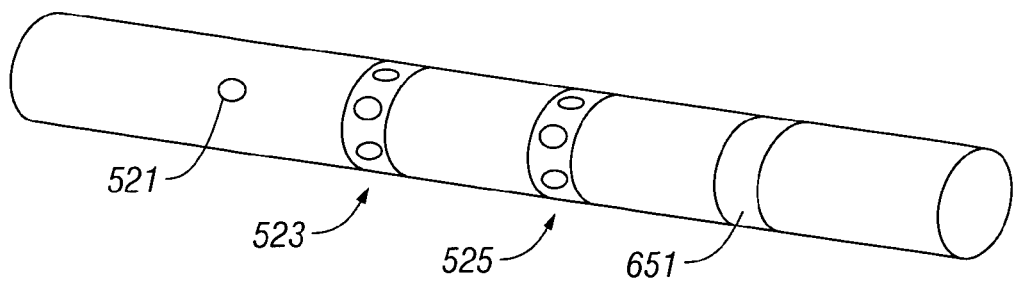
FIG. 12 is an illustration of a logging tool that has a plurality of directional formation evaluation sensors and a gyro-photodiode navigation device according to the present invention.

The gyro arrangement discussed above with reference to FIG. 11 is also useful in wireline applications. For normal wireline applications in open-hole, magnetometer measurements are adequate to establish the orientation of downhole formation evaluation (FE) sensors such as the density or porosity tools discussed above. However, magnetometers are essentially useless for establishing orientations within a cased borehole. The novel gyro-photodiode combination of the present invention may thus be used for making directional measurements using FE sensors in a cased borehole. Such an arrangement is shown in FIG. 12 where a gyro assembly 651 is included with the wireline tool of FIG. 10b. The nuclear sensors of the tool make oriented measurements of a formation property. This can be done through casing. The orientation of the tool is established using the gyro-photodiode combination. By processing of the data, a density image or a porosity image of the earth formation may be obtained through the casing. It should be noted that any kind of image may be obtained provided the FE sensors can make measurements through casing.

The processing of the measurements made in wireline applications may be done by the surface processor 33, by a downhole processor, or at a remote location. The data acquisition may be controlled at least in part by the downhole electronics. Implicit in the control and processing of the data is the use of a computer program on a suitable machine readable medium that enables the processors to perform the control and processing. The machine readable medium may include ROMs, EPROMs, EEPROMs, Flash Memories and Optical disks.

While the foregoing disclosure is directed to the specific embodiments of the invention, various modifications will be apparent to those skilled in the art. It is intended that all such variations within the scope and spirit of the appended claims be embraced by the foregoing disclosure.

What is claimed is:

1. An apparatus for evaluating an earth formation, the apparatus comprising:
 a logging tool configured to be conveyed in a borehole in the earth formation; and
 a spinning mass gyroscope configured to provide an indication of an azimuthal orientation of the logging tool, the gyroscope including:
 (i) at least one photodiode primarily responsive to light having a wavelength less than about 440 nm, and
 (ii) a light source configured to have an output matched to a response curve of the at least one photodiode.

2. The apparatus of claim 1 wherein the logging tool further comprises at least one formation evaluation (FE) sensor configured to be responsive to a property of the earth formation.

3. The apparatus of claim 2 wherein the at least one FE sensor further comprises:
 (i) a radiation source which is configured to irradiate the earth formation; and
 (ii) a plurality of detectors which are configured to be responsive to interaction of the irradiation with the earth formation.

4. The apparatus of claim 3 wherein the radiation source further comprises a neutron source and wherein the plurality of detectors comprise scintillation counters configured to be responsive to gamma rays.

5. The apparatus of claim 3 wherein the radiation source further comprises a neutron source and wherein the plurality of detectors comprises scintillation detectors configured to be responsive to neutrons.

6. The apparatus of claim 2 wherein the at least one FE sensor further comprises at least one of (i) a photodiode having a bandgap greater than about 2 eV, (ii) an array of photodiodes, and (iii) a gradient refractive index lens.

7. The apparatus of claim 2 further comprising a processor configured to an output of the at least one FE sensor and an output of the orientation sensor to provide an image of the earth formation.

8. The apparatus of claim 2 wherein the at least one FE sensor further comprises a directionally sensitive FE sensor.

9. The apparatus of claim 1 wherein the logging tool is configured to be conveyed on a wireline in a cased borehole.

10. The apparatus of claim 1 wherein the logging tool is configured to be conveyed in the borehole on a drilling tubular, the apparatus further comprising a processor configured to use an output of the orientation sensor to measure a direction of drilling.

11. The apparatus of claim 1 wherein the light source further comprises a light emitting diode (LED).

12. A method of evaluating an earth formation, the method comprising:
 conveying a logging tool into a borehole in the earth formation; and
 using a spinning mass gyroscope having at least one photodiode primarily responsive to light having a wavelength less than about 440 nm and a light source configured to have an output matched to a response curve of the at least one photodiode to provide an indication of an azimuthal orientation of the logging tool.

13. The method of claim 12 further comprising using at least one formation evaluation (FE) sensor responsive to a property of the earth formation.

14. The method of claim 13 further comprising:
 (i) using a radiation source on the logging tool for irradiating the earth formation; and
 (ii) using a plurality of detectors for providing an output responsive to interaction of the irradiation with the earth formation.

15. The method of claim 14 wherein the irradiating further comprises using a neutron source and wherein providing the output further comprises using scintillation counters responsive to gamma rays.

16. The method of claim 14 wherein the irradiating further comprises using a neutron source and wherein providing the output further comprises using scintillation detectors responsive to neutrons.

17. The method of claim 13 wherein the at least one FE sensor further comprises at least one of (i) a photodiode having a gap band greater than about 2 eV, (ii) an array of photodiodes, and (iii) a gradient refractive index lens.

18. The method of claim 13 further comprising using an output of the at least one FE sensor and an output of the orientation sensor for providing an image of the earth formation.

19. The method of claim 13 further comprising using, for the at least one FE sensor, a directionally sensitive FE sensor.

20. The method of claim 12 further comprising using a wireline for conveying the logging tool in a cased borehole.

21. The method of claim 12 further comprising conveying the logging tool in the borehole on a drilling tubular, the method further comprising using an output of the orientation sensor to measure a direction of drilling.

22. A computer-readable medium product having stored thereon instructions that when read by a processor cause the processor to perform a method, the method comprising:
 using an output of a formation evaluation sensor on a logging tool and an output of an azimuthal orientation sensor to provide an image of the earth formation wherein the azimuthal orientation sensor comprises a spinning mass gyroscope and at least one photodiode-primarily responsive to light having a wavelength less than about 440 nm and a light source configured to have an output matched to a response curve of the at least one photodiode.

23. The medium of claim 22 further comprising at least one of (i) a ROM, (ii) an EPROM, (iii) an EEPROM, (iv) a flash memory, and (v) an optical disk.

* * * * *